US006928497B2

(12) United States Patent
Sakaba et al.

(10) Patent No.: US 6,928,497 B2
(45) Date of Patent: Aug. 9, 2005

(54) COMPUTER SYSTEM BUS INTERFACE AND CONTROL METHOD THEREFOR

(75) Inventors: Shigeo Sakaba, Yamato (JP); Katsuyuki Nojima, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 09/901,985

(22) Filed: Jul. 10, 2001

(65) Prior Publication Data

US 2003/0167363 A1 Sep. 4, 2003

(30) Foreign Application Priority Data

Jul. 13, 2000 (JP) ......................................... 2000-213283

(51) Int. Cl.[7] .............................................. G06F 13/00
(52) U.S. Cl. ..................................... 710/100; 713/300
(58) Field of Search .............................. 710/100, 12, 1, 710/18, 104, 124; 713/300

(56) References Cited

U.S. PATENT DOCUMENTS

| 5,596,727 A | * | 1/1997 | Literati et al. ............... 710/300 |
| 5,699,533 A | * | 12/1997 | Sakai .......................... 710/316 |
| 5,829,048 A | * | 10/1998 | Ofer et al. ................... 711/166 |
| 6,038,681 A | * | 3/2000 | Saegusa .......................... 714/6 |
| 6,343,324 B1 | * | 1/2002 | Hubis et al. ................. 709/229 |
| 6,412,078 B2 | * | 6/2002 | Murotani et al. ............... 714/9 |
| 6,718,402 B1 | * | 4/2004 | Arroyo ........................ 710/19 |
| 2001/0020282 A1 | * | 9/2001 | Murotani et al. ............... 714/9 |

* cited by examiner

*Primary Examiner*—Tim Vo
*Assistant Examiner*—Kim T. Huynh
(74) *Attorney, Agent, or Firm*—Kunzler & Associates

(57) ABSTRACT

When a device ID of a second, or subsequent, host computer contends with a device ID of another device that can be connected to a SCSI bus, a reset signal (RST) is applied to a SCSI control bus input of the contending device. The contention is determined by detecting whether a terminal power of the second, or subsequent, host computer is active.

15 Claims, 4 Drawing Sheets

COMPUTER SYSTEM BUS INTERFACE AND CONTROL METHOD THEREFOR

FIELD OF THE INVENTION

The present invention relates to a computer system with SCSI (Small Computer System Interface), a bus interface and a control method therefor, and in particular to an effective technique for use in bus control when a contention of SCSI device IDs occurs.

BACKGROUND ART

SCSI (Small Computer System Interface) is a well-known standard I/O bus. Standards have been established for bus widths of 8 bits and 16 bits that provide a maximum data transfer rate of 160 MB/sec. According to the standard for the 8 bit bus width, up to eight device IDs (#0 to #7) can be assigned while, according to the standard for the 16 bit bus width, up to 16 device IDs (#0 to #15) can be assigned. A host computer must also be assigned a device ID, which is typically #7. A variety of devices, including hard disk drives, CD-ROMs and scanners, can be connected to a SCSI bus.

Because of a demand for high extensibility in a computing system, there has been a great demand for connecting multiple storage devices to the system. Particularly, in an environment wherein multimedia data are frequently handled, a lot of voluminous image data may be recorded. Considering use for servers, it is desired to implement data storage of around 500 GB, preferably at a low price. Since many SCSI compatible hard disk drives have been developed, and SCSI is readily extended by using a daisy chain, a mass storage system can be constituted by connecting multiple hard disk drives to a SCSI bus.

Generally, multiple hard disk drives are housed in a hard disk enclosure. Such a hard disk enclosure is provided with a host computer interface card and a service processor for controlling the hard disk drives. Since the host computer and the service processor are also connected to the SCSI bus, they are assigned unique device IDs, respectively. For example, for a 16 bit bus width, #7 is assigned to the host computer and #15 is assigned to the service processor. Thus, for such a hard disk enclosure, excluding the device IDs assigned to the host computer and the service processor, fourteen device IDs are available so that up to fourteen hard disk drives can be connected to the SCSI bus.

However, there may be a need to connect an additional host computer to enhance redundancy, taking system reliability into consideration. The second host computer may be connected through the interface card like the first host computer, and assigned a device ID #6, for example. In such a case, if a hard disk drive mounted in a hard disk enclosure has already been assigned the same device ID #6, a device ID contention would occur. The device ID contention, if occurred, would cause a failure, e.g., data to be written to a hard disk drive by the second host computer are lost, or data recorded on the hard disk drive #6 are lost.

SUMMARY OF THE INVENTION

It is, therefore, an object of the present invention to prevent a failure such as loss or corruption of data from occurring when a device ID contention occurs.

An overview of the present invention will now be given. According to the present invention, when a second, or subsequent, host computer contends with another device that is connected to a SCSI bus for the use of a device ID, a reset signal (RST) is transmitted to a SCSI control bus input of the contending device. Determination for a contention is made depending on whether or not a terminal power of the second or subsequent host computer is active. In such a manner, the contending device can be disconnected from the SCSI bus by inputting the reset signal to the device when the terminal power of the contending host computer is active (the computer has been powered on and is running). By disconnecting the device, the contention can be eliminated and a failure such as loss of data can be prevented.

The reset signal to be input to the contending device may be generated by inputting the terminal powers of the host computers to an AND gate, and inputting the output of the AND gate and the original SCSI reset signal to an OR gate, wherein the output signal of the OR gate is employed as the reset signal. During the operation of a host computer that has the same device ID as a specific device, the reset signal to the device is constantly generated. But when the host computer having the same device ID is not active, the specific device can be controlled by the original SCSI reset signal.

Further, a latch circuit may be provided between the output of the AND gate and the input of the OR gate so that once the reset signal is input to the contending device, it can be continuously applied regardless of the state of the terminal power. This causes the contending device to be maintained in the reset state even if, for example, the terminal power of the host computer becomes inactive due to momentary power outage. Therefore, it is possible to prevent unexpected situations from occurring, e.g., loss of data due to the momentary power outage which may cause the contending device to be released from the reset state.

Further, if SCSI operates with low-voltage differential signals, a low-voltage differential signal from the SCSI bus is input to the OR gate after it is converted to a TTL level signal, and the output of the OR gate is input to a device after it is converted to a low-voltage differential signal. The device may be a hard disk drive.

PREFERRED EMBODIMENTS

Figure 1:
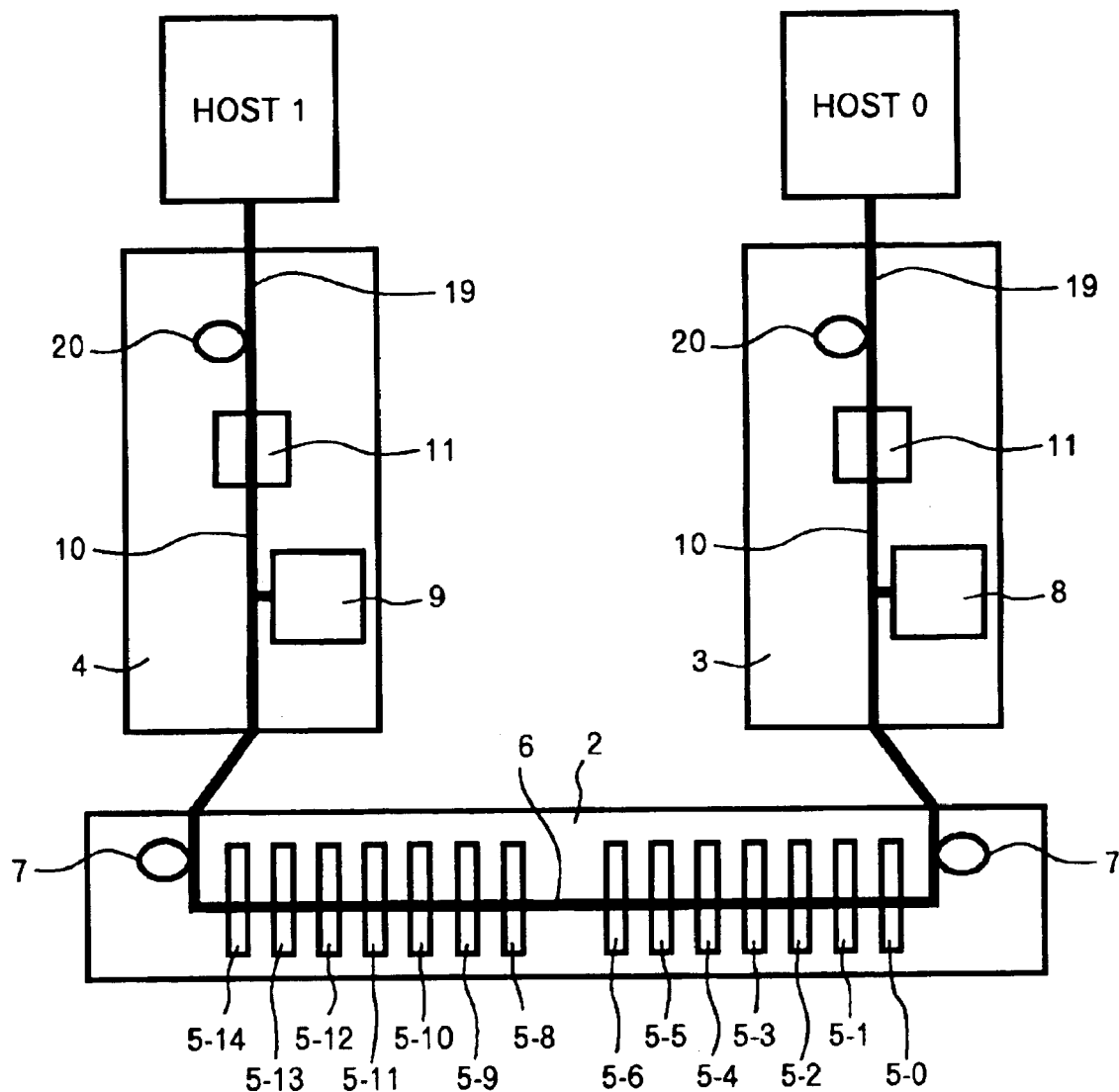
FIG. 1 is a block diagram showing an example of a computer system according to one embodiment of the present invention.

The preferred embodiments of the present invention will now be described in detail with reference to the accompanying drawings. It should be noted, however, that the present invention can be variously modified, and should not limited to the embodiments. The same reference numerals are used throughout the description of the embodiments to denote corresponding or identical components.

FIG. 1 is a block diagram illustrating an example of a computer system according to the embodiment of the present invention. The computer system in this embodiment comprises a host computer Host0, a host computer Host1, an enclosure 2, and interface cards 3 and 4.

The first host computer Host0 has a device ID of, for example, #7 and is connected to a SCSI bus of the enclosure 2 via the interface card 3. The second host computer Host1 has a device ID of, for example, #6 and is connected to the SCSI bus of the enclosure 2 via the interface card 4. Although the device ID (#7) having the highest priority is assigned to the host computer Host0, and the device ID (#6) having the second highest priority is assigned to the host computer Host1 in this embodiment, other device IDs may be assigned to the host computers.

The enclosure 2 includes fourteen slots 5-0 to 5-6, 5-8 to 5-14 to which hard disk drives can be attached, respectively. The number of each slot (i.e., "n" in 5-n) denotes a device ID number to be assigned. In this embodiment, the device ID (#6) of the host computer Host1 contends with the device ID (#6) of the device (hard disk drive) attached to the slot 5-6. The contention is resolved as described later. If the host computer Host1 is not used and the device ID #6 is not reserved therefor, the device ID #6 may be assigned to another device (a hard disk drive in this case). Therefore, a maximum storage capacity can be obtained by connecting the maximum number of hard disk drives to the SCSI bus. Each slot is connected by a SCSI bus 6 which is terminated by terminators 7.

The interface cards 3 and 4 include service processors 8 and 9 for the enclosure 2, respectively. The service processors 8 and 9 are responsible for overall control of the enclosure 2 to, for example, determine whether a hard disk drive is attached to a slot, monitor and control temperature and power of the hard disk drives. Such service functions need not be performed by both of the service processors 8 and 9. When the service processor 8, for example, is performing the service functions, the service processor 9 may operate as a slave under the control of the service processor 8. The service processors 8 and 9 are connected to SCSI buses 10 in the respective interface cards 3 and 4, and device ID #15 is assigned to the service processor 8.

Repeaters 11 may be provided in the respective interface cards 3 and 4. The repeater 11 serves as a driver for maintaining signal levels above a predetermined level when a longer SCSI bus is used. SCSI buses 19 of the interface cards 3 and 4 are terminated by terminators 20, and connected to the host computers Host0 and Host1, respectively.

Table 1 shows a list of device IDs assigned in the above manner.

TABLE 1

| Device ID | Device |
|---|---|
| ID#0 | Hard disk drvie #0 |
| ID#1 | Hard disk drive #1 |
| ID#2 | Hard disk drive #2 |
| ID#3 | Hard disk drive #3 |
| ID#4 | Hard disk drive #4 |
| ID#5 | Hard disk drive #5 |
| ID#6 | Host1 or hard disk drive #6 |
| ID#7 | Host0 |
| ID#8 | Hard disk drive #8 |
| ID#9 | Hard disk drive #9 |
| ID#10 | Hard disk drive #10 |
| ID#11 | Hard disk drive #11 |
| ID#12 | Hard disk drive #12 |
| ID#13 | Hard disk drive #13 |
| ID#14 | Hard disk drive #14 |
| ID#15 | Enclosure service processor |

Figure 2:
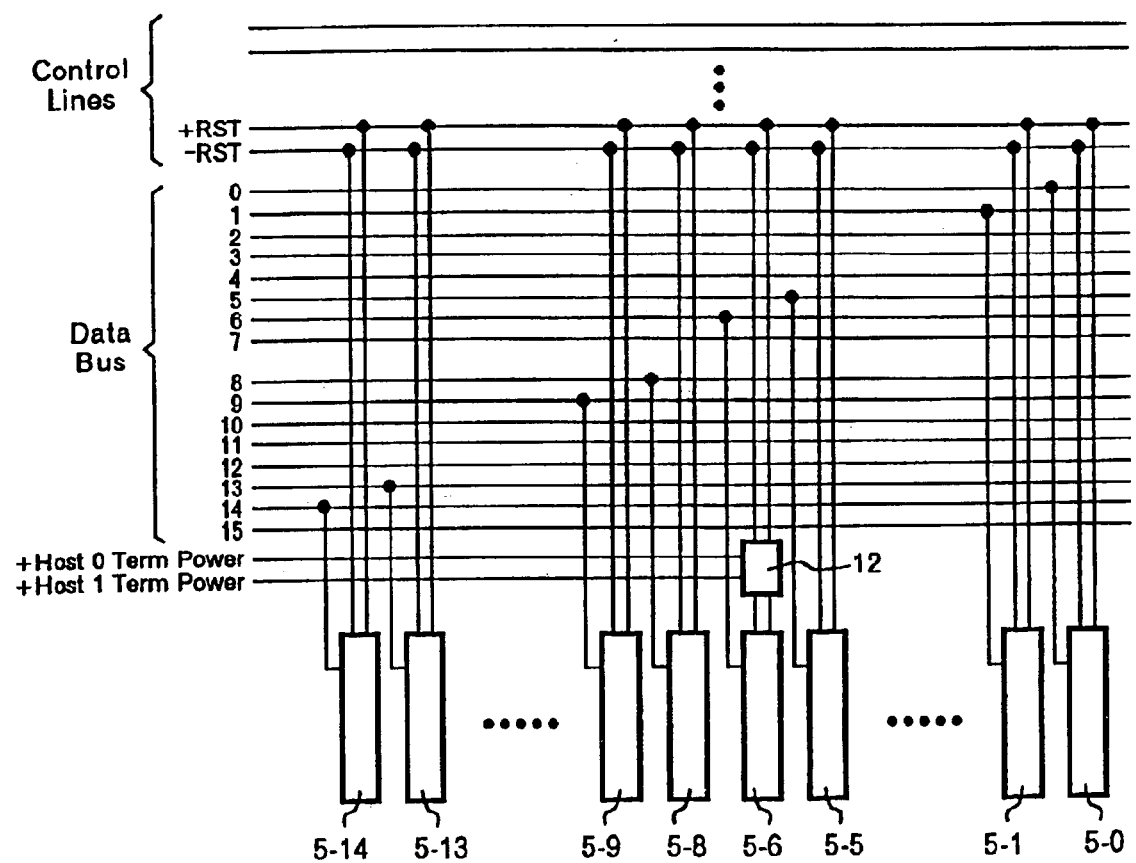
FIG. 2 illustrates a connection of a SCSI bus with slots in an enclosure.

FIG. 2 illustrates connections of the SCSI bus 6 of the enclosure 2 with the slots 5-0 to 5-6, 5-8 to 5-14. The SCSI bus includes 16 data bus lines and some control lines. The control lines include +RST and −RST lines for providing a low-voltage differential signal. In this embodiment, each signal transmitted is assumed to be a low-voltage differential signal; however, a high-voltage differential signal or a negative logic TTL level signal may also be employed. Although not shown in the drawing, it should be noted that each of the data bus lines #0 to #15 in this embodiment actually consists of plus (+) and minus (−) lines for transmission of differential signals.

The slot 5-0 is connected to the control lines including +RST and −RST lines (the other control lines are not shown) and to the data bus consisting of 16 data lines, and is associated with the data line #0 for a device ID. Therefore, a device attached to the slot 5-0 is assigned a device ID #0. Similar connection and association are implemented for the other slots. That is, the slots 5-1 to 5-5 are associated with the data lines #1 to #5, respectively, and the slots 5-8 to 5-14 are associated with the data lines #8 to #14, respectively. The numbers of the associated data lines are assigned as device IDs for the devices attached to the respective slots. Such device ID assignment by association with data lines has been well known in the art.

Although all the 16 data lines are actually connected to the slots 5-n (n is an integer of 0 to 14), only the connection of the data line with the associated slot is shown in FIG. 2 in order to clearly indicate the association therebetween, but the connection of the 16 data lines with each slot is not shown.

In this embodiment, a reset signal control circuit 12 is inserted between the reset signal input of the slot 5-6 and the reset lines (+RST and −RST lines) of the control lines. The reset signal control circuit 12 receives terminal power signals from the host computers Host0 and Host1 to control the device attached to the slot 5-6 in accordance with the terminal power states.

Figure 3:
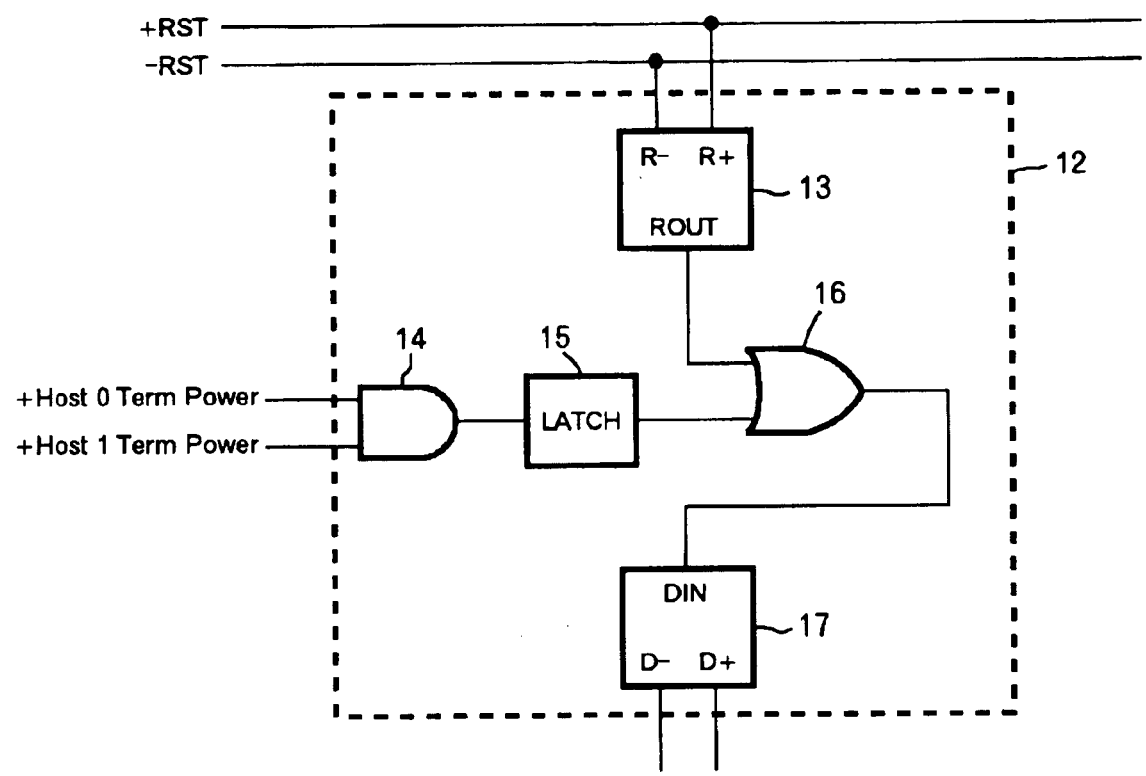
FIG. 3 is a detailed block diagram illustrating a reset signal control circuit.

FIG. 3 is a detailed block diagram illustrating the reset signal control circuit 12, which includes a low-voltage differential signal receiver 13, an AND gate 14, a latch circuit 15, an OR gate 16 and a low-voltage differential signal driver 17.

The low-voltage differential signal receiver 13 converts a low-voltage differential signal on the SCSI bus to a TTL level signal. The AND gate 14 receives as inputs the terminal power signals from the host computers Host0 and Host1, and the latch circuit 15 latches the output voltage of the AND gate 14. The outputs of the low-voltage differential signal receiver 13 and the latch circuit 15 are input to the OR gate 16, and the low-voltage differential signal driver 17 converts the output of the OR gate 16 to a low-voltage differential signal.

In the reset signal control circuit 12, when the terminal power signals from the host computers Host0 and Host1 are both active, i.e., the two host computers are running, the output of the AND gate 14 (latch circuit 15) and, hence, the output of the OR gate 16 goes high, and a reset signal is applied to the device having the device ID #6. As a result, the device having the device ID #6 is disconnected from the SCSI bus. The disconnected device is treated as though it does not exist on the SCSI bus. In this fashion, the device ID contention between the host computer Host1 and the device attached to the slot 5-6 is avoided. When the host computer Host1 is not active, a reset signal from the SCSI bus is transmitted via the OR gate 16 to the device so that the device having the device ID #6 can be operated normally.

The latch circuit 15 is provided to maintain the reset state of the device once the active state of the host computer Host1 is detected to cause the device to be reset. Even if the terminal power goes low due to a failure such as momentary halt of the computer system, the output of the latch circuit 15 is kept high so that the reset state of the device is not altered. This prevents the reset state from being canceled due to the momentary halt or the like, and avoids unexpected situation such as data loss or corruption. In this case, a reset operation may be performed by powering off the enclosure 2.

According to the computer system of the present embodiments, wherein a plurality of host computers are connected via the SCSI bus to a plurality of devices, a device ID contention can be avoided while maintaining a capability of connecting the maximum number of devices. Therefore, the present invention provides an environment wherein a mass storage system is controlled by a plurality of host computers via SCSI.

The present invention has been specifically described with respect to the preferred embodiments; however, the present invention is not limited to the above embodiments, and can be variously modified without departing from the scope of the invention.

For example, although it has been assumed in the above embodiments that the contention of device ID #6 occurs, the present invention may be applied for a contention of another device ID. Further, by providing a plurality of reset signal control circuits 12, the present invention may also be applied to a case in which a plurality of device Ids contend.

In addition, the present invention may also be applied to other devices such as CD-ROM, scanner, etc. in place of or in addition to the hard disk drive used in the above embodiments.

The reset signal control circuit 12, which has performed the required functions by a combination of AND and OR gates, may employ other logical gates to perform the same functions.

Furthermore, although the low-voltage differential signal has been used in the above embodiments, a high-voltage differential signal or a TTL level negative logical signal may be used instead. In such a case, an appropriate receiver and driver suitable for these signals and corresponding to the low-voltage differential signal receiver 13 and the low-voltage differential signal driver 17 may be adopted.

Moreover, a bus width of 16 bits has been employed; however, the present invention may also be applied in the same manner for a bus width of 8 bits.

Figure 4:
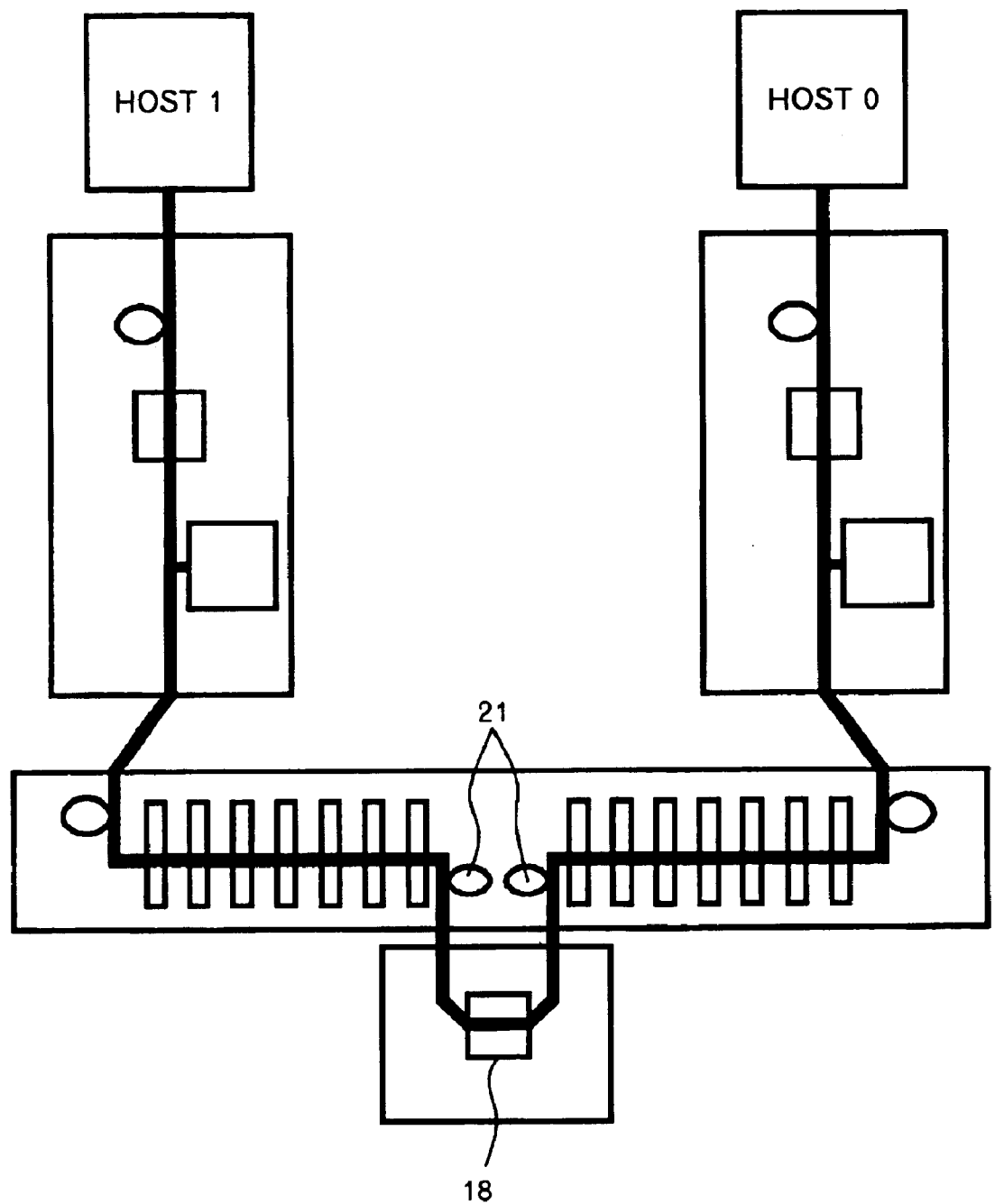
FIG. 4 is a block diagram showing another example of a computer system according to the embodiment.

Furthermore, the SCSI bus 6 of the enclosure 2 in the above embodiments may be divided at a repeater 18 as shown in FIG. 4. Terminators 21 are provided at both ends of the repeater 18. When the repeater 18 is disconnected, the slots on the left are separated from the slots on the right, and the host computers Host0 and Host1 can control the respective devices independently of each other. When the repeater 18 is connected, the system can be controlled in the same manner as in the above embodiments.

According to the present invention disclosed herein, a failure such as data loss or corruption can be prevented when a device ID contention occurs between devices interconnected by a SCSI bus.

What is claimed is:

1. A computer system in which a plurality of host computers and a plurality of other devices are interconnected by SCSI (Small Computer System Interface), comprising:
   a plurality of host computers and one or more other devices interconnected by SCSI wherein one of said host computers has a device ID identical to a device ID of one of said other devices; and
   inputting a reset signal to a SCSI control bus reset input of said one of said other devices in response to a terminal power of said one of said host computers being active, wherein said reset signal inputting means comprises an AND gate receiving at least said terminal power of said one of said host computers, and an OR gate having a first input receiving the output of said AND gate, and a second input receiving a reset signal of a SCSI bus.

2. The computer system of claim 1, further comprising a latch circuit arranged between said AND gate and said OR gate, and wherein said reset signal is continuously supplied by said latch circuit.

3. The computer system of claim 1, wherein said other devices comprise hard disk drives.

4. A bus interface for the SCSI standard to which a plurality of host computers and a plurality of other devices are connected, comprising:
   a plurality of host computers and one or more other devices interconnected by SCSI wherein a device ID of one of said host computers is identical to a device ID of one of said other devices;
   outputting a reset signal to a reset terminal of said bus interface connected to said one of said other devices in response to a terminal power of said one of said computers being active; and
   an AND gate receiving at least said terminal power of said one of said host computers, and an OR gate having a first input receiving the output of said AND gate, and a second input receiving a reset signal of a SCSI bus.

5. The bus interface of claim 4, wherein a latch circuit is arranged between said AND gate and said OR gate, and said reset signal is continuously supplied by said latch circuit.

6. A method for controlling a bus interface conforming to the SCSI standard to which a plurality of host computers and a plurality of other devices are connected, comprising:
   determining whether a terminal power of one of a plurality of host computers interconnected to one or more other devices by SCSI is active when a device ID of said one of said host computers is identical to a device ID of one of said other devices; and
   outputting a reset signal to a reset terminal of said bus interface connected to said one of said other devices when said terminal power is active, wherein said terminal power of said one of said host computers is input to an AND gate, the output of said AND gate is input to one input of an OR gate via a latch circuit, a signal from a reset control bus of said bus interface is input to another input of said OR gate, and the output of said OR gate is continuously supplied to a reset input of said one of said other devices.

7. The method of claim 6, wherein said other devices are hard disk drives.

8. The method of claim 6, further comprising said one of said other devices disengaging from the bus interface upon receiving the reset signal.

9. The method of claim 6, wherein said other devices are selected from the list consisting of hard-disk drives, CD-ROM drives, WORM drives, and Bernoulli Drives.

10. A system for controlling a bus interface conforming to the SCSI standard and to which a plurality of host computers and other devices are connected, the system comprising:
    a first host computer operating on a bus interface conforming to the SCSI standard and having a first device ID;
    a host power terminal configured to provide power to the first host computer;

a device having a second device ID, the device configured to receive a reset signal and thereby disengage from the bus interface; and a conflict resolution module configured to provide a reset signal to the device having a second device ID upon receiving notice of a conflict between the first device ID and the second device ID and after determining that the first host computer is receiving power from the host power terminal.

11. The system of claim 10, wherein the conflict resolution module comprises:

an AND gate configured to receive a first and second terminal power signal and thereby provide a powered state signal;

a latch configured to receive the powered state signal and thereby provide a powered signal that is persistent; and an OR gate configured to receive a reset input and to receive the powered signal that is persistent and in return, provide the reset signal.

12. The system of claim 10, wherein the conflict resolution module is operably connected to the host power terminal.

13. The system of claim 12, wherein the conflict resolution module is configured to activate the reset signal when the host computer is in a powered state.

14. The system of claim 10, wherein the device is selected from the list consisting of hard-disk drives, CD-ROM drives, WORM drives, and Bernoulli Drives.

15. The system of claim 10, further comprising a second host computer operating on the bus interface conforming to the SCSI standard and having a third device ID, the second host computer being connected to the bus interface subsequent to the first host computer.

* * * * *